US009475022B2

(12) United States Patent
Gaultney

(10) Patent No.: US 9,475,022 B2
(45) Date of Patent: Oct. 25, 2016

(54) APPARATUS FOR PRODUCING A LIQUID CONCENTRATE FROM A DRY MATERIAL

(75) Inventor: Lawrence Doka Gaultney, Elkton, MD (US)

(73) Assignee: E I DU PONT DE NEMOURS AND COMPANY, Wilmington, DE (US)

( * ) Notice: Subject to any disclaimer, the term of this patent is extended or adjusted under 35 U.S.C. 154(b) by 718 days.

(21) Appl. No.: 13/814,761

(22) PCT Filed: Sep. 6, 2011

(86) PCT No.: PCT/US2011/050526

§ 371 (c)(1),
(2), (4) Date: Feb. 7, 2013

(87) PCT Pub. No.: WO2012/033747

PCT Pub. Date: Mar. 15, 2012

(65) Prior Publication Data

US 2013/0286767 A1 Oct. 31, 2013

Related U.S. Application Data

(60) Provisional application No. 61/380,794, filed on Sep. 8, 2010.

(51) Int. Cl.
*B01F 15/02* (2006.01)
*B01F 1/00* (2006.01)
(Continued)

(52) U.S. Cl.
CPC ......... *B01F 15/0216* (2013.01); *B01F 1/0022* (2013.01); *B01F 1/0038* (2013.01); *B01F 5/0206* (2013.01); *B01F 5/0212* (2013.01); *B01F 5/10* (2013.01); *B01F 15/00032* (2013.01)

(58) Field of Classification Search
CPC ...... B01F 5/0206; B01F 5/10; B01F 5/0212; B01F 15/0216
USPC ................ 366/136, 137, 173.1, 173.2, 152.2
See application file for complete search history.

(56) References Cited

U.S. PATENT DOCUMENTS 3,871,272 A * 3/1975 Melandri ............. C12G 1/0216 366/137
4,099,267 A * 7/1978 King .................... A01C 23/042 366/142

(Continued)

FOREIGN PATENT DOCUMENTS

DE 38 44 174 A1 7/1990
DE 10 2004 026 477 A1 12/2005

(Continued)

OTHER PUBLICATIONS

Machine translation of Steinbach (DE 3844174), reference dated Jul. 5, 1990, translation accessed via Espacenet.com on Dec. 4, 2015.*

*Primary Examiner* — Charles Cooley
*Assistant Examiner* — Marc C Howell
(74) *Attorney, Agent, or Firm* — Linda D. Birch

(57) ABSTRACT

An apparatus for converting a dry material into a liquid concentrate includes a mixing vessel having an outlet opening, a dispenser for dispensing a predetermined weight of a dry material at a predetermined drop rate onto a predetermined drop location within the vessel, an inlet pipe connectable to a source of liquid for introducing a liquid into the vessel; a sensor for sensing the volume of liquid within the vessel; a pump for supplying a pressurized flow of recirculating liquid to the vessel; and a first, a second and a third agitating nozzle mounted within the vessel. Each agitating nozzle is operative to produce a jet of liquid oriented in a predetermined direction within the vessel. The nozzles are cooperable to generate within the vessel a moving body of liquid into which a dry material dispensed into the vessel is able to dissolve or to disperse.

7 Claims, 6 Drawing Sheets

(51) Int. Cl.

*B01F 5/02* (2006.01)
*B01F 5/10* (2006.01)
*B01F 15/00* (2006.01)

(56) References Cited

U.S. PATENT DOCUMENTS 5,458,414 A * 10/1995 Crump .................. B01F 3/1221 366/137
5,961,845 A * 10/1999 List ....................... B01F 1/0027 137/268
6,821,011 B1 * 11/2004 Crump .................. B01F 5/0206 366/137
7,075,019 B2 7/2006 Bergman
2001/0042717 A1 11/2001 Chioini et al.
2008/0285377 A1 * 11/2008 Rhee ........................ G01N 1/38 366/132
2010/0080077 A1 4/2010 Coy
2011/0041952 A1 2/2011 Gaultney

FOREIGN PATENT DOCUMENTS

FR 1 008 645 A 5/1952
FR 2 163 802 A5 7/1973
WO 98 05932 2/1998

* cited by examiner

APPARATUS FOR PRODUCING A LIQUID CONCENTRATE FROM A DRY MATERIAL

BACKGROUND OF THE INVENTION

1. Field of the Invention

This invention relates to an apparatus for producing a liquid concentrate from a dry material.

2. Description of the Prior Art

Liquid agricultural chemicals are typically distributed to bulk retail consumers at a transfer location known as a "mixing station". A schematic diagram of a typical mixing station generally indicated by the reference character S is illustrated to the left of the double dividing lines indicated on FIG. 1.

The mixing station S includes one or more tanks $T_1$ to $T_n$ each of which contains a liquid chemical material. Each tank is connected through a respective metering pump $P_1$ to $P_n$ to a retail delivery line $L_1$ to $L_n$. One or more of the tanks may also be connected via a respective valve $V_1$ to $V_n$ to a common mix tank M. The outlet of common mix tank M is also connected to a retail delivery line $L_{MT}$. The system is controlled by the station operator from a master central control room C.

In a typical retail transaction a predetermined volume of liquid material is metered from either one or more tank(s) $T_1$ to $T_n$ or from the common mix tank M and delivered via the appropriate delivery line into a customer's tanker or sprayer W. The system S is well suited to the dispensation of liquid chemical materials.

However, it is not feasible for some agricultural chemicals, such as sulfonylurea-based materials, to be shipped from manufacturer to distributor in liquid form. Instead, such materials are transported in dry form.

This circumstance creates a problem when delivering dry materials to a customer at the mixing station. In such instances it is necessary to manually convert the dry product into a liquid form. A precise amount of the dry chemical product must be dispensed from a small container, transferred to the common mix tank, and manually converted into a liquefied slurry. When larger quantities of the product are desired a bulk dispensing apparatus known as a Precision-Pac™ dispenser is commonly used to dispense precise weights of the dry product. However, it usually takes some period of time for the dry product to be converted to a liquid state so that it can be pumped with other liquids to the customer's vehicle.

U.S. Pat. No. 7,075,019 (Bergman et al.), assigned to the assignee of the present invention, discloses a measuring and dispensing system for dry flowable materials.

This procedure is perceived as disadvantageous for several reasons. As noted, it is time-consuming, thus reducing the number of customers that may be processed through the station. Moreover, it is possible that the dry product may not be dissolved or dispersed properly before it is loaded into the customer's vehicle.

In view of the foregoing it is believed advantageous to provide an apparatus to quickly convert a dry material into a liquid concentrate form that may be dispensed to a customer with other liquid materials.

SUMMARY OF THE INVENTION

The present invention is directed toward a mixing apparatus for converting a dry material into a liquid concentrate. The apparatus includes:

a mixing vessel having a substantially frustoconical region that tapers toward an outlet opening;

a dispenser for dispensing a predetermined weight of a dry material at a predetermined drop rate onto a predetermined drop location within the mixing vessel;

an inlet pipe connectable to a source of liquid for introducing a liquid into the vessel, a sensor for sensing the volume of liquid within the vessel and for terminating liquid flow upon the introduction of a predetermined volume of liquid into the vessel, the predetermined volume of liquid being directly related to the weight of the dry material dispensed into the vessel;

a pump having an input port and an output port, the input port being in fluid communication with the outlet opening of the vessel, the output port of the pump being connected to a recirculation line, the pump being operative to draw liquid through the outlet opening of the vessel and to supply a pressurized flow of liquid to the recirculation line.

In accordance with the present invention, a first, a second and a third agitating nozzle is mounted within the vessel. Each agitating nozzle is connected to the recirculation line. Each nozzle is operative to produce a jet of liquid oriented in a predetermined direction within the mixing vessel. The nozzles are cooperable to generate within the mixing vessel a moving body of liquid into which a dry material dispensed into the mixing vessel is able to dissolve or to disperse.

BRIEF DESCRIPTION OF THE DRAWINGS

The invention will be more fully understood from the following detailed description taken in connection with the accompanying drawings, which form a part of this application, and in which.

DETAILED DESCRIPTION OF THE INVENTION

Figure 1:
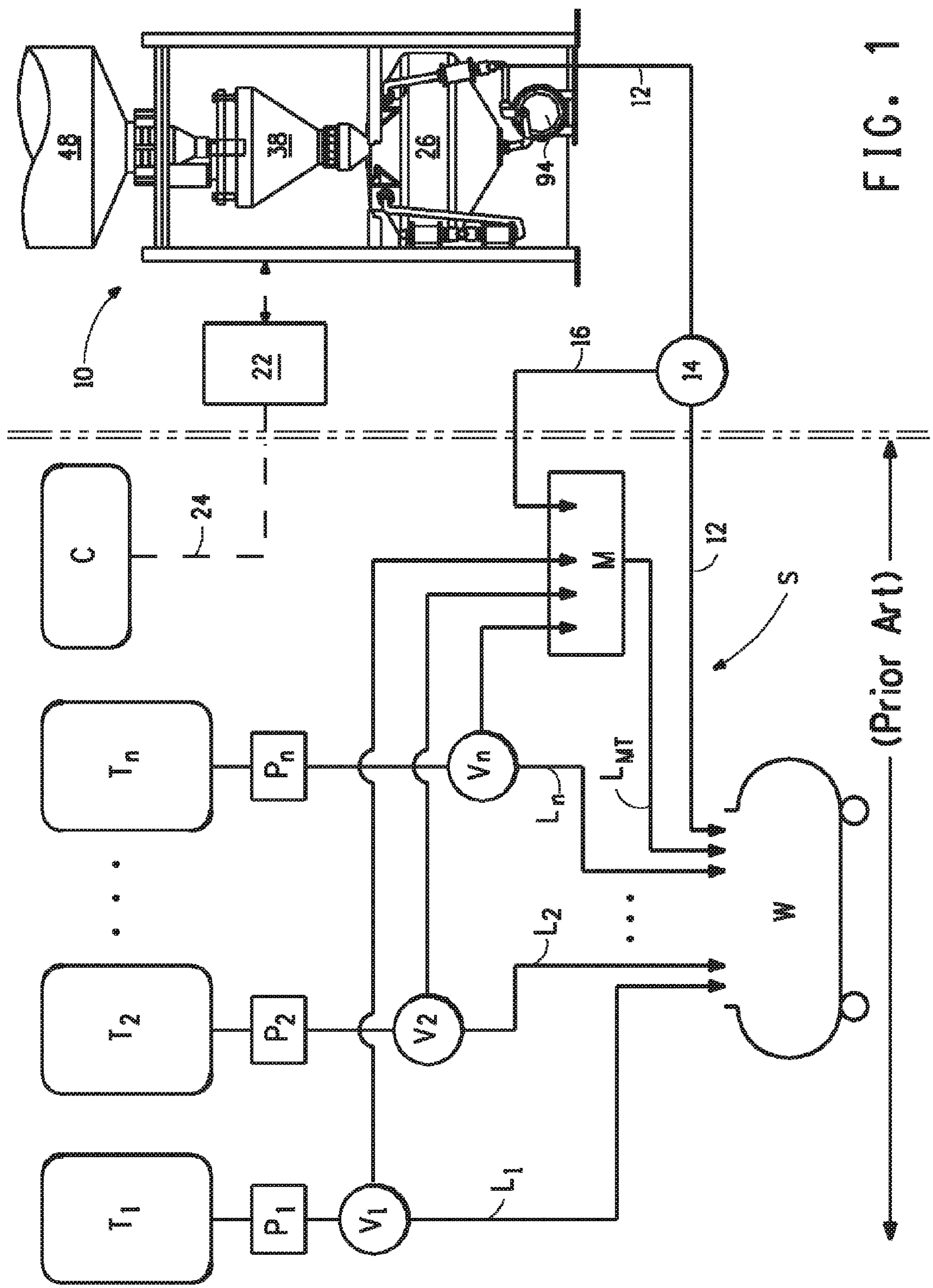
FIG. 1 (Prior Art)
FIG. 1 illustrates, to the left of the double dividing lines thereon, a stylized schematic diagram of a mixing station for dispensing liquid material(s) to a retail consumer, while the right hand portion of the FIG. 1 illustrates the interconnection into the mixing station of a mixing apparatus for converting a dry granular material into a concentrated liquid in accordance with the present invention.

Throughout the following detailed description similar reference numerals refer to similar elements in all Figures of the drawings. It should be understood that various details of the structure and operation of the present invention as shown in various Figures have been stylized in form, with some portions enlarged or exaggerated, all for convenience of illustration and ease of understanding.

With reference to the drawings the portion of the FIG. 1 to the right of the double dividing lines illustrates a mixing apparatus generally indicated by the reference character 10 for converting a dry material into a concentrated liquid in accordance with the present invention incorporated with a mixing station S of the prior art. The mixing apparatus of the present invention is useful to convert any dry material into a liquid form. By "dry material" it is meant any dry, flowable soluble or dispersible material, whether in powder, crystal, particulate, granular or any other physical form.

The liquid concentrate produced by the mixing apparatus 10 may be treated exactly as the other liquid products dispensed at the mixing station. That is, the liquid concentrate may be piped directly to the customer's vehicle W through a retail delivery line 12, or, if desired, diverted by a valve 14 and carried through another outlet line 16 to the mixing tank M.

Figure 2:
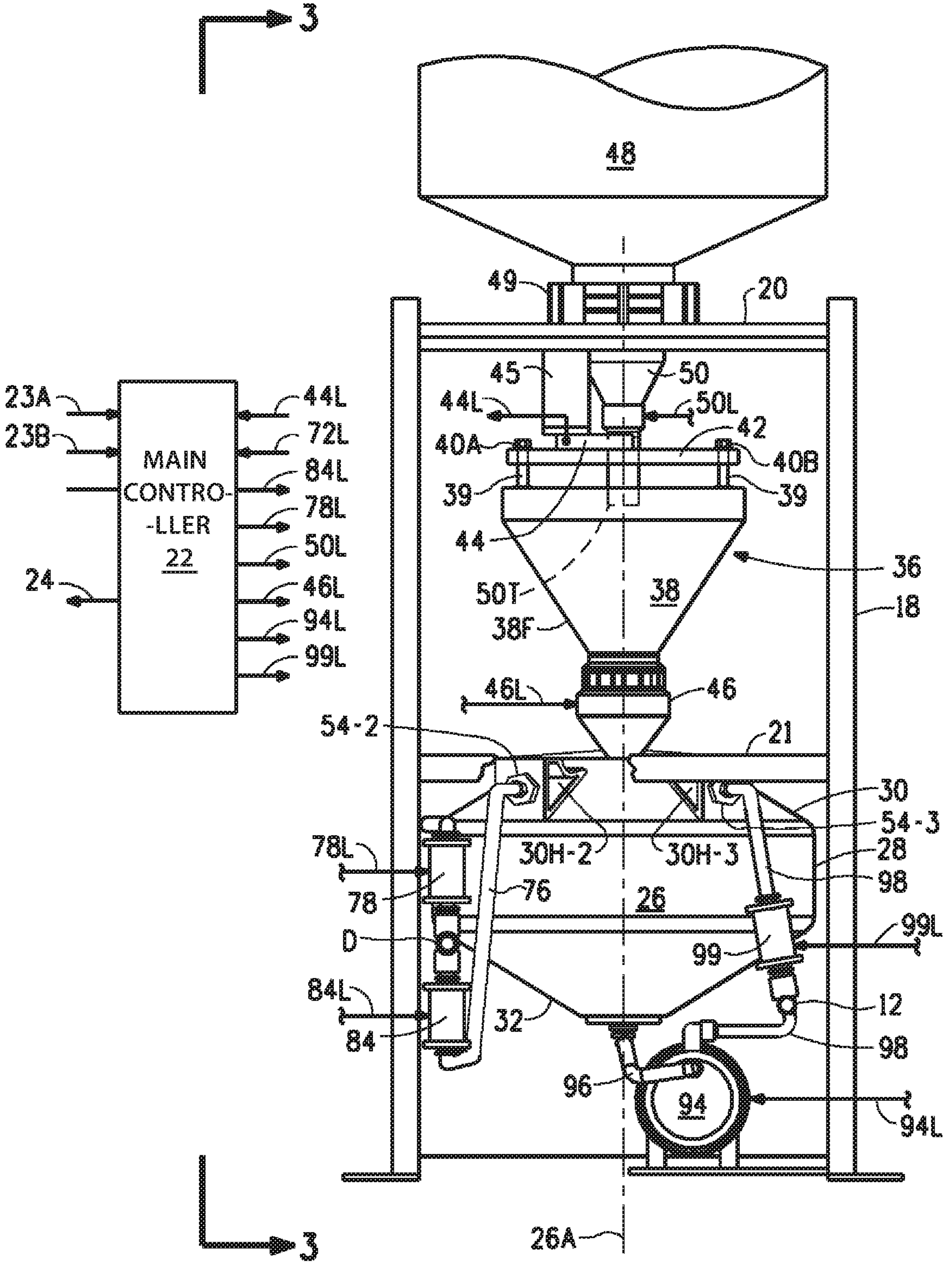
FIG. 2 is a front elevation view of a mixing apparatus in accordance with the present invention.
Figure 3:
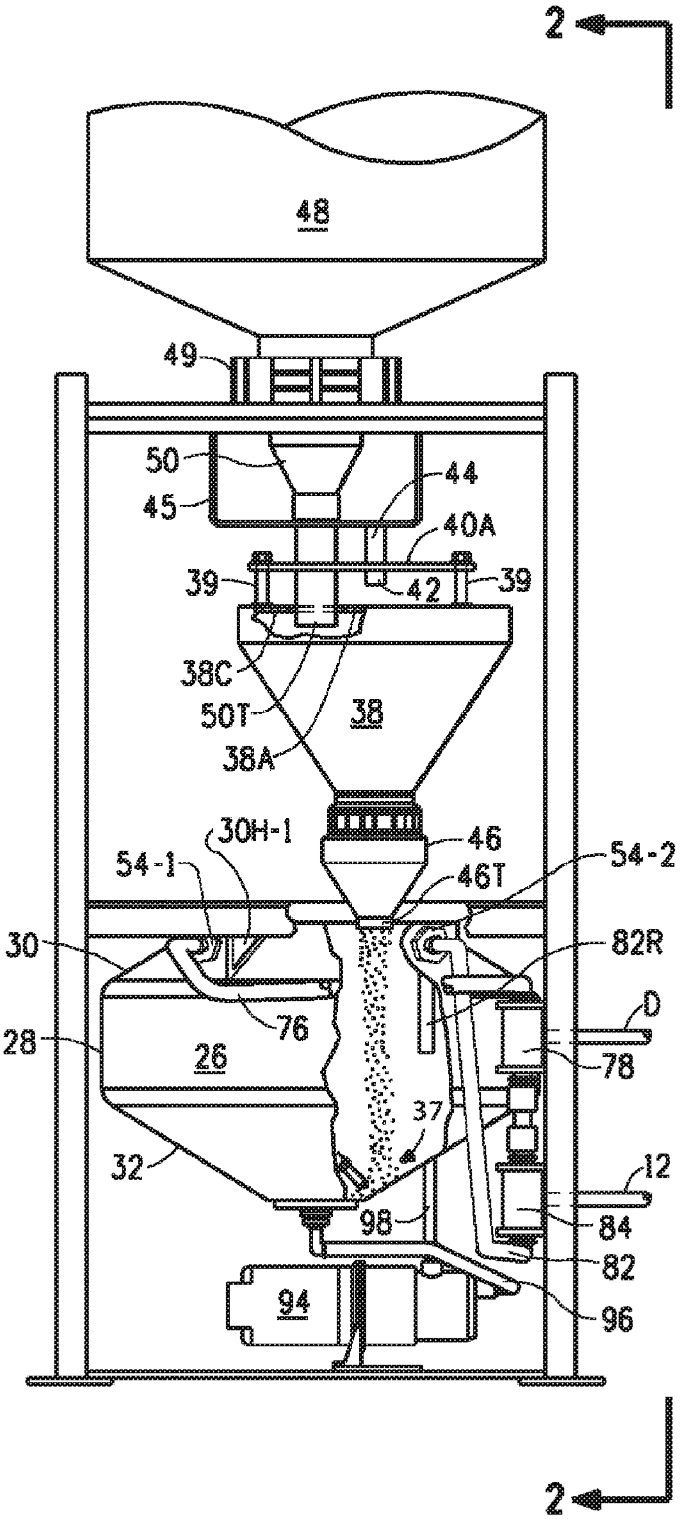
FIG. 3 is a side elevation view of the mixing apparatus of the present invention taken along view lines 3-3 in FIG. 2.

As best seen in FIGS. 2 and 3 the mixing apparatus 10 includes a framework 18 having an upper platform 20 and a central support platform 21. The framework 18 may be conveniently formed from interconnected lengths of metal channel secured together to form a rigid structure. The apparatus 10 may be enclosed by structural panels (with or without an access door) secured to the framework 18.

A microprocessor-based main controller 22 (FIG. 2) is conveniently mounted to the framework 18 or to any suitable member adjacent to the apparatus 10. The mixing apparatus may be configured in a "stand-alone" configuration in which the various parameters that determine the weight of the dry material needed to produce a given volume of liquid concentrate are directly input to the controller 22 as inputs 23A, 23B. However, as noted, it lies within of the present invention to incorporate the mixing apparatus 10 into the operation of the mixing station S. In this instance the controller 22 is interfaced (as by a serial connection) 24 into the control system of the station S and operable by the operator in the master central control room C (FIG. 1).

A mixing vessel generally indicated by the reference character 26 is supported from the central support platform 21. The mixing vessel 26 has a central axis 26A extending therethrough. The mixing vessel 26 is a hollow member having a substantially cylindrical central section 28 with an upper and a lower frustoconical section 30, 32 respectively attached at each axial end. The vessel 26 may be formed by any suitable manufacturing technique (as by rotational molding) of any suitable chemically resistant, structurally sound material, such as high density polyethylene or low density polyethylene. The vessel may also be formed from stainless steel.

A dispenser arrangement 36 for dispensing a predetermined weight of a dry material is mounted within the framework above the mixing vessel 26. The dispenser arrangement 36 is operative to dispense the dry material at a predetermined drop rate onto a predetermined drop location 37 (FIGS. 3 and 6) located on the lower frustoconical section 32 of the mixing vessel 26.

A recirculating pump 94 is connected to the outlet of the mixing vessel 26. The pump 94 is operative to draw liquid from the vessel 26 through a pump suction line 96 and to supply a pressurized flow of liquid from the pump outlet back to the vessel 26 through a recirculation line 98. Suitable for use as the recirculating pump 94 is that apparatus sold by Flowserve Corporation as model number SMP1000. The pump 94 is controlled by the controller 22 over a line 94L. A valve 99 directs the flow from the pump outlet to either the recirculation line 98 or to the retail delivery line 12. The valve 99 is preferably a solenoid controlled valve such as that sold by Flowserve Corporation as model SUSB003. The valve is controlled by the controller 22 over a line 99L.

Turning to a more detailed description of the elements of the mixing apparatus 10 the dispenser arrangement 36 includes a supply hopper 38 having a frustoconical lower section 38F. As best seen in FIG. 3 the upper end of the hopper 38 is closed by an integral cover 38C having an eccentrically located access aperture 38A therethrough. The cover 38C of the hopper 38 is attached by bolts 39 (diagrammatically indicated in the drawings) to the ends of a spaced pair of flat bars 40A, 40B. The bars 40A, 40B are, in turn, secured across a mounting channel 42 that is attached to a load cell 44. The load cell 44 is itself attached to the underside of a generally U-shaped brace 45 that depends from the upper platform 20. Suitable for use as the load cell 44 is that apparatus sold by Rice Lake Weighting Systems as model number 1042. A signal representative of the weight of the granular material within the hopper 38 is output from the load cell 44 to the controller 22 over a signal line 44L. The load cell and structures thus described comprise a "loss-in-weight" weighing system whereby the weight of dry material dispensed from the hopper 38 may be accurately determined.

Dry material is dispensed from the lower end of the hopper 38 through a dispensing valve 46. The valve 46 is controlled by a signal supplied from the controller 22 over a signal line 46L.

Care must be taken to insure accuracy of the weight of the dispensed dry material. The dispensing valve 46 must be able to accommodate various environmental factors, such as vibration in the apparatus, and changes in product characteristics.

The dispensing value 46 includes a valve body having a tapered frustoconical valve chamber. A solenoid-operated generally cylindrical spring-loaded valve stem is axially movable within the valve body. An annular frustoconical valve seat is mounted at the lower end of the valve body. The lower end of the valve seat tapers inwardly toward the axis 26A. The lower end of the valve stem, when received on the annular frustoconical valve seat, closes the lower end of the valve chamber and prevents material passage from the valve chamber into the drop tube 46T. When the solenoid operator of the valve is actuated (by a signal on the line 46L) the valve stem displaces axially upwardly, away from the valve seat, thus creating an annular flow channel between the lower end of the stem and the frustoconical valve seat, allowing an annular curtain of dry material to flow from the valve chamber to the drop tube. If desired the solenoid can be pulsed to fine-tune the accuracy of the dry material dispensation. The dispensing valve could be manually operated, if desired. Suitable for use as the dispensing valve 46 is that solenoid operated valve as disclosed in above-referenced U.S. Pat. No. 7,075,019 (Bergman et al.), assigned to the assignee of the present invention.

In the preferred embodiment illustrated the dispenser arrangement 36 further includes a recharging bin 48 that is mounted above the upper platform 20. The recharging bin 48 is connected through an expandable locking connector 49 to a dispensing valve 50. The dispensing valve 50 (similar to the valve 46) is supported from the upper platform 20. The drop tube 50T of the valve 50 projects through the access aperture 38A (similar to the valve 46) into the supply hopper 38. The drop tube 50T should pass freely through the access aperture 38A into the hopper 38 so as not to interfere with the accuracy of weight determination. The valve 50 is controlled by a signal from the controller 22 over a signal line 50L.

Figure 4A:
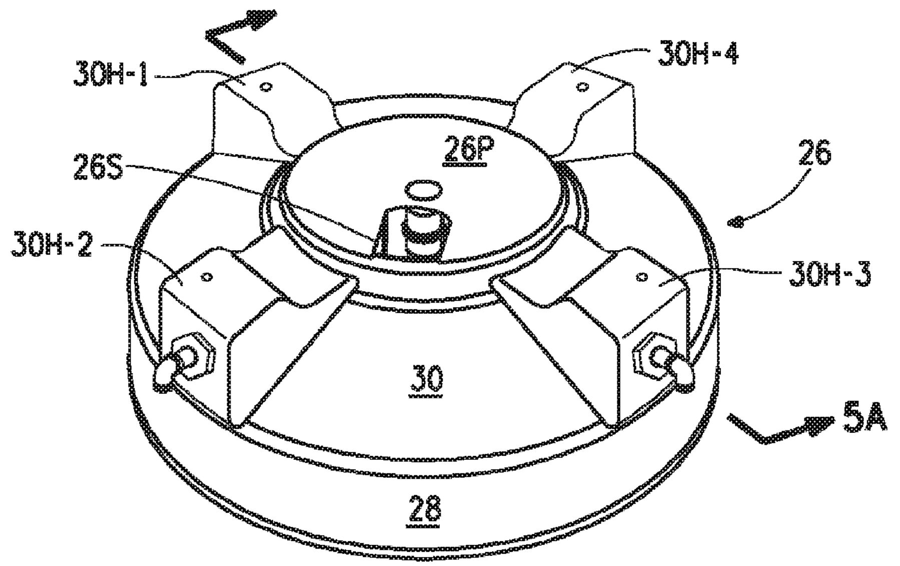
FIG. 4A is a front perspective view of the mixing vessel used in the mixing apparatus of the present invention.

As perhaps best seen in FIG. 4A the upper frustoconical section 30 of the mixing vessel 26 inclines slightly upwardly toward a central opening that defines the mouth of the vessel 26. The vessel 26 is closed by a cover plate 26P that threads into the inside surface of the mouth. The cover plate 26P has an access slot 26S therein. The drop tube 46T of the dispensing valve 46 enters and extends a short distance into the vessel 26 through the slot 26S (FIG. 3). The entry point of drop tube 46T is disposed at a location offset from the axis 26A. The end of the drop tube 46T is disposed above the drop location 37.

Mounting hangers 30H-1, 30H-2, 30H-3 and 30H-4 (FIG. 4A) are secured in spaced circumferential locations on the exterior surface of the upper frustoconical section 30. Each hanger 30H is a generally hollow triangular protrusion that is formed in the upper frustoconical section 30. The horizontally extending upper wall of each hanger 30 is connected, as by bolts (not shown) to the central support platform 21, thereby to secure the mixing vessel 26 within the framework 18. As seen from FIGS. 4A, 4B and 5A, a bulkhead fitting 54-1, 54-2 and 54-3 extends through the backwall of the hangers 30H-1, 30H-2, and 30H-3, respectively, for purposes to be described.

Figure 5A:
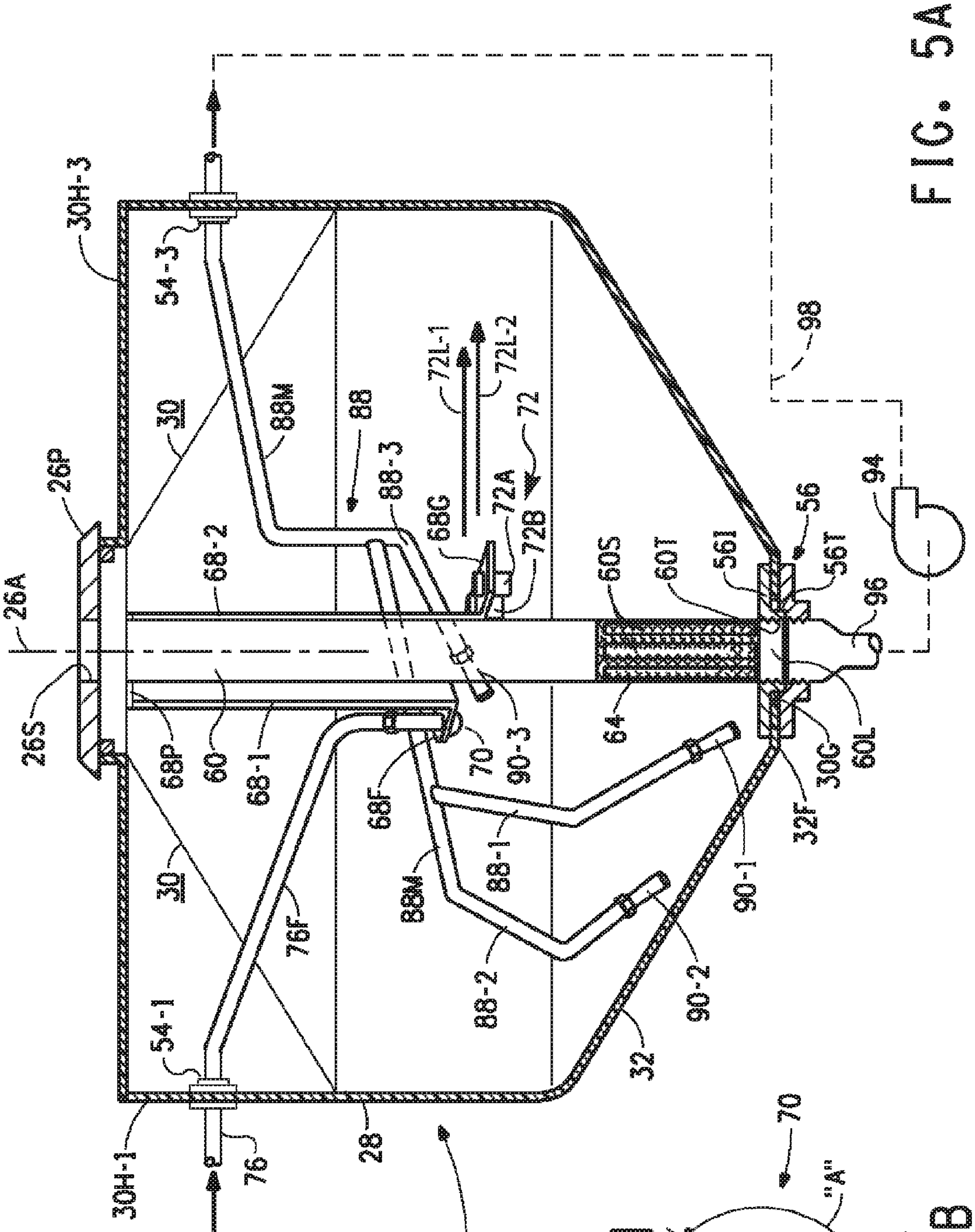
FIG. 5A is a section view of the mixing vessel taken generally along section lines 5A-5A in FIG. 4A.

With reference to FIG. 5A the lower section 32 of the vessel 26 tapers more severely than the upper section toward the central axis 26A. The lower section 32 includes a flattened region 32F in the central region of the lower section. The outlet opening 30G of the vessel 26 is formed through the flattened region 32F. A bulkhead fitting 56 is secured about the outlet opening 30G. As is the case with fittings 54-1, 54-2, 54-3, the fitting 56 includes an interior collar 56I and an exterior collar 56E that when threaded together permits a sealed connection between the interior of the vessel 26 and the pump suction line 96. In practice the interior collar 56I is attached to the exterior collar along a threaded connection 56T. The outside surface of the pump suction line 96 is attached to the exterior collar 56E along a threaded connection 96T.

Suitable for use as the bulkhead fittings 54-1, 54-2, 54-3, and 56 are those devices sold by Banjo Corporation as model TF220V.

A hollow standpipe 60 extends centrally and axially through mixing vessel 26. The lower end 60L of the standpipe 60 is secured into the inside surface of the interior collar 56I of the bulkhead fitting 56 along a threaded connection 60T. A portion of the standpipe 60 just above the threaded lower end 60L has axially extending slots 60S formed therein. The slots 60S communicate with the interior of the vessel 26 so that liquid from the vessel may pass into the suction line 96. The slotted region of the standpipe is surrounded by a perforated member 64. The perforated member 64 may be conveniently implemented using a screen sleeve, although any foraminous structure may be used.

The openings in the perforated member 64 serve to prevent relatively larger sized particles present in the interior of the vessel 26 from being drawn through the slots 60S. The openings in the perforated member 64 should be large enough to allow sufficient liquid outflow to the pump 94, but small enough prevent passage of larger particles which could potentially affect pump flow of block the nozzles (which will be described) that are disposed in the vessel 26. The size of the openings depends upon the dry material being converted to liquid form, but generally speaking, for agricultural chemical products, the openings should be sized to prevent passage of particles larger than about 0.7 mm.

Figure 4B:
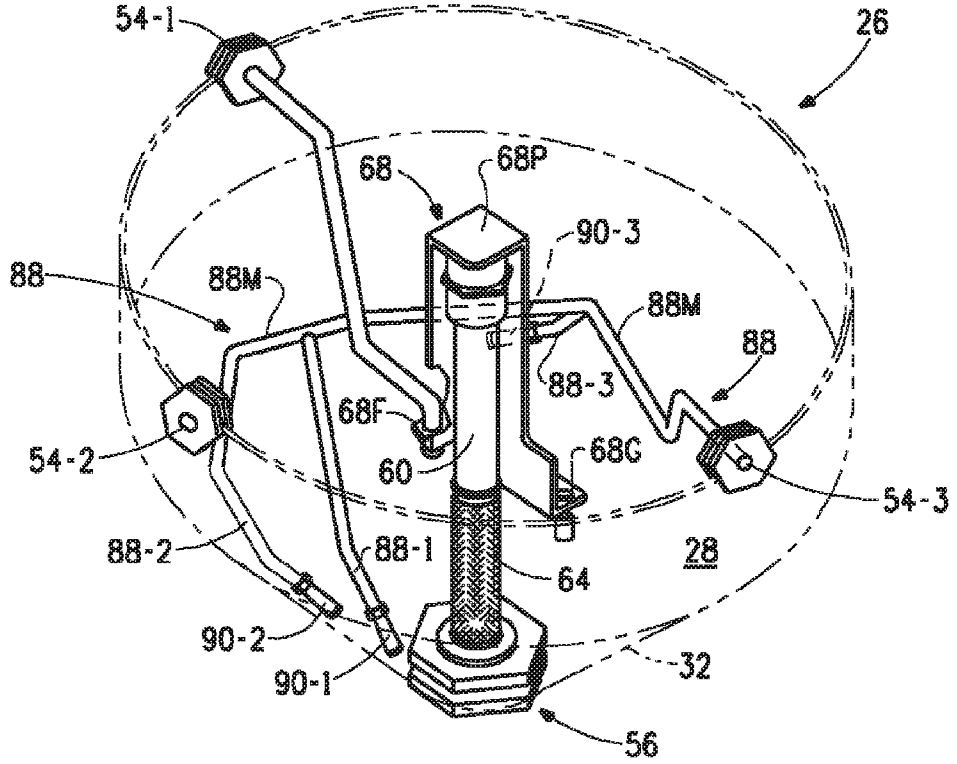
FIG. 4B is a stylized perspective view of the interior of the mixing vessel of FIG. 4A illustrating the orientation of the agitating nozzles therewithin, the vessel being rotated ninety degrees clockwise from its position with respect to the front of the apparatus as occupied in FIG. 4A.

As perhaps best seen in FIGS. 4B and 5A) the plate 68P of a generally L-shaped bracket 68 is secured to the top end of the standpipe 60. The legs 68-1, 68-2 of the bracket 68 extend from the plate 68P along the exterior of the standpipe 60. Each leg 68-1, 68-2 terminates in a respective shelf 68F, 68G.

A rinse nozzle 70 (FIG. 5B) is mounted on the shelf 68F. The rinse nozzle 70 terminates in a perforated aerating head 70H. Suitable for use as the rinse nozzle 70 is the container rinsing nozzle sold by TeeJet Technologies, Wheaton, Ill., as model number VSM-*-28. The shelf 68G carries an array of switches 72 (of which only the switches 72A, 72B are visible in the drawings). The switches extend, stair-step fashion, for different predetermined distances below the shelf 68G thereby to provide a signal representative of the level of liquid material within the vessel 26. The signal output from each switch is carried over a respective signal line 72L-1, 72L-2. It should be appreciated that the liquid level within the vessel 26 may be monitored from the exterior of the vessel, if desired.

A rinse supply line 76 extends into the vessel 26 through the first bulkhead fitting 54-1. On the interior of the vessel 26 the rinse line is connected to the rinse nozzle 70 through a flexible line 76F. On the exterior of the vessel the rinse line 76 is connectable to a liquid source supply conduit D via a rinse control valve 78. Suitable for use as the rinse control valve 78 is that solenoid-operated valve sold by Spraying Systems Corporation as model 344BEC-24-C. The rinse control valve 78 is controlled by signals applied over a control line 78L.

A liquid fill line 82 projects into the vessel 26 through the second bulkhead fitting 54-2. On the exterior of the vessel 26 the fill line 82 is connected to the liquid supply conduit D through a fill control valve 84. Control signals are applied to the fill control valve 84 over a control line 84L. The valve 84 may be implemented using the solenoid-operated valve as used for the valves 78 and 99 (FIG. 2). A length of rigid pipe 82R (FIG. 3) extends from the fitting 54-2 through the interior of the vessel 26 at a position offset from the axis 26A and in a direction generally parallel thereto.

A multi-branched nozzle support structure generally indicated by reference character 88 (FIG. 4B) extends into the interior of the vessel 26 from the third bulkhead fitting 54-3. In the preferred embodiment the nozzle support structure 88 includes a main supply arm 88M from which branches a first supply arm 88-1, a second supply arm 88-2, and a third supply arm 88-3. Each supply arm 88-1, 88-2 and 88-3 terminates in a respective nozzle 90-1, 90-2 and 90-3. The nozzles 90-1, 90-2 and 90-3 are implemented using an eductor nozzle such as those sold by TeeJet Technologies, Wheaton, Ill., as model Y33180-PP or Y9270-PP. An eductor nozzle allows an inlet flow introduced into the nozzle at a given flow rate to entrain ambient liquid through the nozzle. This action permits a relatively small pump flow to circulate relatively larger volumes of liquid.

Each nozzle 90-1, 90-2 and 90-3 is oriented and secured with respect to each other such that each nozzle is operative to produce a jet of recirculating liquid oriented in a predetermined direction within the vessel 26. Each nozzle generates an agitating action that combines with the agitating action produced by the other nozzles to produce a moving body of liquid within the vessel such that the dry granular material dispensed into the vessel is efficiently dissolved or dispersed.

Having described the structure of the mixing apparatus, its operation may now be discussed. It is assumed that the hopper 38 has been replenished from the storage bin 48 such that an initial charge of a specific dry material is stored therein. It is also assumed that a predetermined initial volume of liquid is already present in the vessel 26.

To begin the retail transaction a customer specifies the acreage to be covered and, optionally, the desired application rate of the dry material. These parameters may be input directly to the apparatus via the inputs 23A, 23B to the controller 22 (in a "stand-alone" implementation) or via the operator of the mixing station from the master central control room C.

The controller responds to the initial input parameters and determines the appropriate weight of dry material required to be converted into liquid form to meet the customer demand. The controller responds to the signals representative of the specified acreage and specified application rate and calculates the required weight of product to be dispensed as well as the predetermined drop rate of the material into the vessel 26. It should be noted that for some dry materials a standard application rate is used in the calculation of the weight to be dispensed.

From the derived weight information the controller calculates the requisite liquid level for the vessel. If additional liquid is required the fill valve 84 is opened (via a signal on the line 84L). Flow into the vessel 26 is terminated under the control of the signals produced from the appropriate level sensing switches 72 over the appropriate signal line 72L-1, 72L-2.

When a predetermined minimum level of water is present in the vessel (either initially or after supplying additional liquid) the recirculation valve 99 is opened (via a signal on the line 99L) and the pump 99 is actuated to provide a recirculating flow into the vessel through the recirculating line 98.

Introduction of recirculating liquid into the vessel generates the agitating flow within the vessel 26 to be described hereafter.

With an agitating flow is set up within the vessel 26 the dispensing valve 46 is opened (via a control signal applied over the line 46L) and dry material begins to drop at a predetermined rate into the vessel. Material is dispensed until the weight signal from the load cell 44 over the line 44L indicates that the desired weight of material has passed through the valve 46. The valve 46 may be pulsed, if necessary to insure that all of the dry material has been dispensed.

Figure 6:
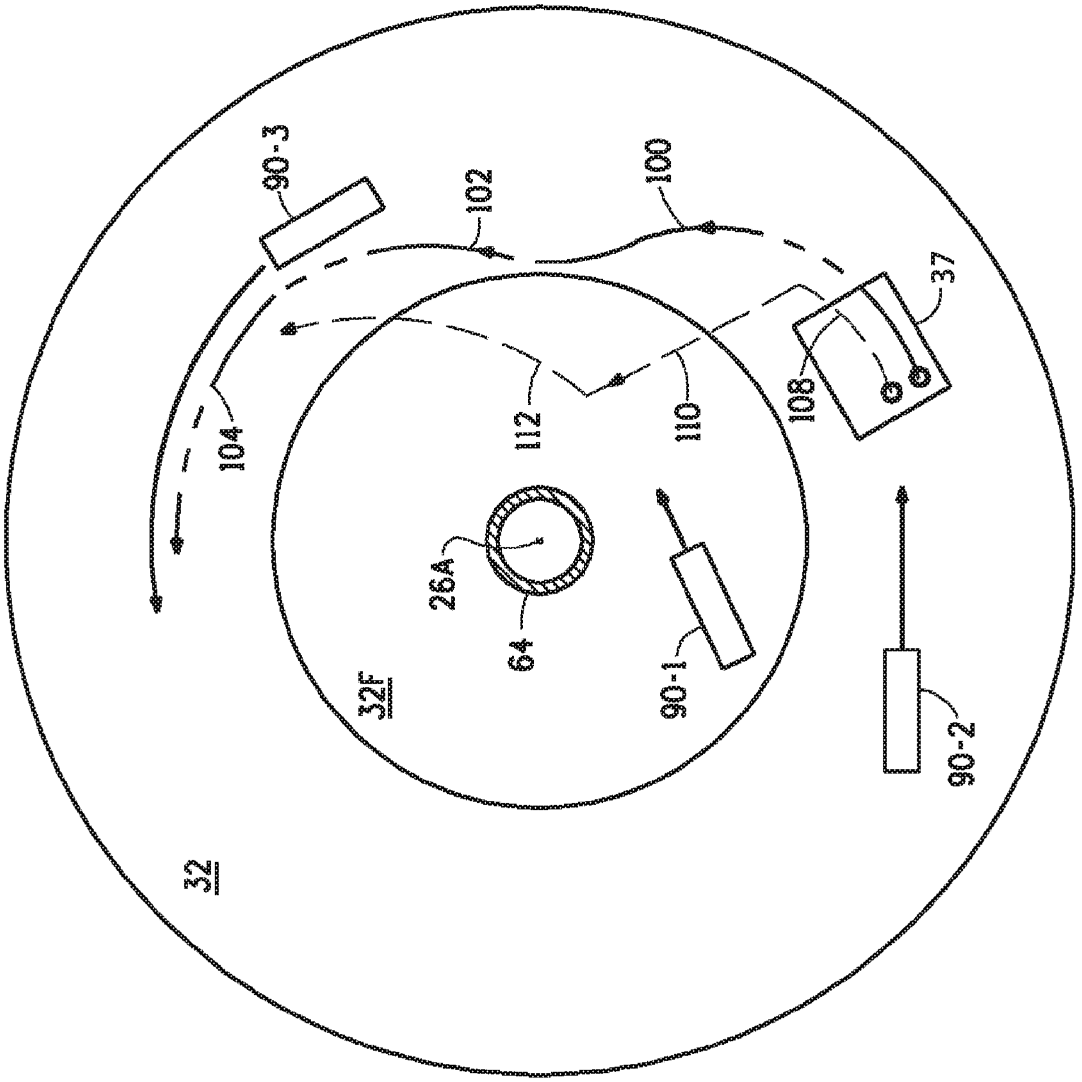
FIG. 6 is a diagram illustrating movement of a relatively heavy and a relatively light particle of a dry material within the mixing vessel produced by the cooperative association of the agitating nozzles.

The agitation action produced within the vessel 26 by the nozzles is believed best illustrated in FIG. 6.

The nozzle 90-1 is oriented to produce a jet directed substantially downwardly and inwardly toward the axis 26A of the vessel 26. This jet produces an agitating action in the vicinity of screen sleeve 64 surrounding the outlet opening of the vessel.

The nozzle 90-2 is oriented to produce a jet directed toward the granular material drop location 37. The agitating action created by this jet produces a liquid flow that is directed along a generally spiraling trajectory with respect to the outlet opening of the vessel.

The nozzle 90-3 is oriented to produce a jet that is directed substantially circumferentially about the interior of the vessel 26.

The effect of the jets produced from these nozzles is believed best understood by analysis of the motion of individual particles under the combined influence of the agitating flows produced by nozzles as such particles are dispensed into the vessel. The described relative orientation among the nozzles cooperate to produce agitating flow actions that generate a moving body of liquid within the mixing vessel such that a dry material dispensed into the mixing vessel is able to dissolve or to disperse to form a liquid concentrate.

Consider first a relatively light particle, illustrated in FIG. 6 as an open circle. An example of a "relatively light" particle is tribenuron methyl herbicide agricultural chemical, manufactured by E.I. du Pont de Nemours and Company, Wilmington, Del. and sold under the trademark EXPRESS®. The motion of the particle is indicated by dot-dash lines.

As a relatively light particle drops into the vessel toward the drop zone 37 and into the flowing liquid it is entrained in the flow primarily produced by the jet from the nozzle 90-2. This flow carries the particle along a generally spiraling circumferential trajectory, as at 100, relative to the axis 26A. As the jet impacts the lower frustoconical surface 32 of the vessel 26 the spirally flowing particle is deflected upwardly (relative to the flattened bottom 32F) of the vessel and radially outwardly (relative to the axis 26A), as illustrated at 102. As the particle spirals upwardly and outwardly it moves under the influence of the flow produced primarily by the nozzle 90-3. The particle is thus swept along a generally circumferential flow path about the axis 26A, as at 104.

The motions of a relatively heavy particle (for example, the herbicide agricultural chemical manufactured by E.I. du Pont de Nemours and Company, Wilmington, Del. and sold under the trademark ALLY XP®) may also be understood from FIG. 6. The path of the heavier particle is indicated by dashed lines.

As such a heavier particle drops into the vessel 26 toward the drop location 37 it may be initially entrained in the flow produced by the nozzle 90-2, as at 108. However, its mass and momentum may be sufficient to overcome the flow produced by the nozzle 90-2. Thus, the relatively heavier particle may respond to gravity and fall toward the outlet opening, as at 110.

The flow produced by the 90-1 nozzle prevents relatively heavier particles from building or accumulating near the screen 64. The jet from the nozzle 90-1 displaces the relatively heavier particle from the vicinity of the screen 64 toward the lower frustoconical surface 32, as suggested at 112. As the relatively heavier particle is moved upwardly and radially outwardly, it is influenced by the flow from the nozzle 90-2. Further upward and outward spiraling motion moves particle into the circumferential flow produced primarily by the nozzle 90-3. As a result of the combined swirling, energetic action of the jets produced by the nozzles a fluidized moving bed of particles is created within the vessel. The particles are moved along as a swirling, agitated layer of particles that are swept along above the lower frustoconical surface of the vessel in a generally circumferential flow path. Accumulation of particles near the outlet opening of the vessel is prevented by the action of the jet 90-1.

After the last of the product is introduced into the vessel 26, the agitating action described continues for at least a time that is deemed required to dissolve or to disperse the particular dry product into liquid form. At that point the recirculating valve 98L is closed (via a signal on the line 98L) and the flow from the pump directed into the flow line 12, evacuating the liquid concentrate to the customer.

Figure 5B:
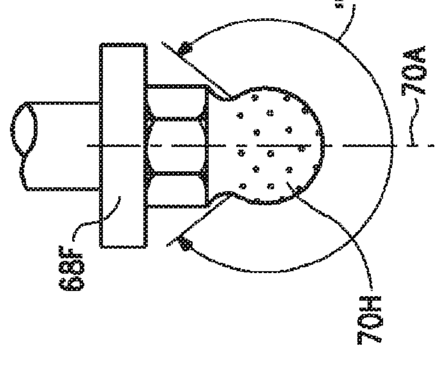
FIG. 5B is an elevation view of the rinse nozzle for the mixing vessel.

Finally, the rinse valve 78 is asserted by a signal applied over the line 78L. As seen in FIG. 5B the perforated rinse head 70H of the nozzle 70 produces a substantially spherical rinsing spray pattern that bathes the central and lower frustoconical regions of the vessel with rinse liquid. The rinse pattern extends in the plane of FIG. 5B about the axis 70A for an angle that is approximately two-hundred-forty degrees (240°), as illustrated at angle "A". The two-hundred-forty degree angular pattern also extends a full three-hundred-sixty degrees (360°) in the third dimension (i.e., circumferentially) about the axis 70A.

After rinsing is complete, the valve 78 is closed. The hopper 38 is replenished and the vessel re-filled to the desired initial level, in anticipation of the next customer usage.

Those skilled in the art, having the benefits of the present invention as hereinabove set forth may impart modifications thereto. Such modifications are to be construed as lying within the contemplation of the present invention, as defined by the appended claims.

What is claimed is:

1. A mixing apparatus for converting a dry material into a liquid concentrate, the apparatus comprising:

a mixing vessel having a substantially frustoconical region that tapers toward an outlet opening;

a dispenser for dispensing a predetermined weight of a dry material at a predetermined drop rate onto a predetermined drop location located on the frustoconical region of the mixing vessel;

an inlet pipe connectable to a source of liquid for introducing a liquid into the vessel, a liquid level sensor disposed within the vessel for sensing the volume of liquid within the vessel and for signaling for terminating liquid flow upon the introduction of a predetermined volume of liquid into the vessel, the predetermined volume of liquid being directly related to the weight of the dry material dispensed into the vessel;

a pump having an input port and an output port, the input port being in fluid communication with the outlet opening of the vessel, the output port of the pump being connected to a recirculation line, the pump being operative to draw liquid through the outlet opening of the vessel and to supply a pressurized flow of liquid to the recirculation line;

a first, a second and a third agitating nozzle mounted within the vessel, each agitating nozzle being connected to the recirculation line, each nozzle being operative to produce a jet of recirculating liquid oriented in a predetermined direction within the mixing vessel, the nozzles being cooperable to generate within the mixing vessel a moving body of liquid into which a dry material dispensed into the mixing vessel is able to dissolve or to disperse, the first agitating nozzle being oriented to produce a jet directed downwardly and inwardly toward the vicinity of the outlet opening of the mixing vessel; the second agitating nozzle being oriented to produce a jet of the recirculating liquid directed toward the dry material drop location being operative to create an agitating liquid flow directed along a generally spiraling trajectory that extends upwardly and outwardly with respect to the outlet opening of the mixing vessel, and the third agitating nozzle being oriented to produce a jet of the recirculating liquid directed substantially circumferentially with respect to the vessel.

2. The mixing apparatus of claim 1 further comprising a foraminous member disposed over the outlet opening of the vessel.

3. The mixing apparatus of claim 1 wherein the foraminous member comprises a screen sleeve.

4. The mixing apparatus of claim 1 further comprising a rinse nozzle disposed within the vessel, the rinse nozzle being connectable to a source of rinse liquid.

5. The mixing apparatus of claim 4 wherein the rinse nozzle terminates in a perforated aerator for generating a spray over a predetermined portion of the vessel.

6. The mixing apparatus of claim 1 wherein each agitating nozzle comprises an eductor nozzle.

7. A mixing station (S) for delivering a liquid chemical product to a consumer, the mixing station comprising:

one or more tanks ($T_1$ to $T_n$) each of which contains a volume of a liquid chemical material, an outlet line ($L_1$ to $L_n$) connected to each respective tank, and a metering pump ($P_1$ to $P_n$) for pumping a metered amount of liquid from each tank to a respective outlet line, and a mixing apparatus (10) for converting a dry material into a liquid concentrate, the mixing apparatus comprising:

a mixing vessel having a substantially frustoconical region that tapers toward an outlet opening;

a dispenser for dispensing a predetermined weight of a dry granular material at a predetermined drop rate onto a predetermined drop location located on the frustoconical region of the mixing vessel;

an inlet pipe connectable to a source of liquid for introducing a liquid into the vessel, a liquid level sensor disposed within the vessel for sensing the volume of liquid within the vessel and for signaling for terminating liquid flow upon the introduction of a predetermined volume of liquid into the vessel, the predetermined volume of liquid being directly related to the weight of the dry material dispensed into the vessel;

a pump having an inlet port and an outlet port, the inlet port being in fluid communication with the outlet opening of the vessel, the outlet port of the pump being connected to a recirculation line, the pump being operative to draw liquid through the outlet opening of the vessel and to supply a pressurized flow of liquid to the recirculation line;

a delivery line for delivering liquid concentrate to a customer, a valve for selectively controlling communication between the pump outlet port and either the recirculation line or the delivery line, and a first, a second and a third agitating nozzle mounted within the vessel, each agitating nozzle being connected to the recirculation line, each nozzle being operative to produce a jet of liquid oriented in a predetermined direction within the mixing vessel, the nozzles being cooperable to generate within the mixing vessel a moving body of liquid into which a dry material dispensed into the mixing vessel is able to dissolve or to disperse, the first agitating nozzle being oriented to produce a let directed downwardly and inwardly toward the vicinity of the outlet opening of the mixing vessel; wherein the second agitating nozzle being oriented to produce a let of the recirculating liquid directed toward the dry material drop location being operative to create an agitating liquid flow directed along a generally spiraling trajectory that extends upwardly and outwardly with respect to the outlet opening of the mixing vessel, and the third agitating nozzle being oriented to produce a jet of the recirculating liquid directed substantially circumferentially with respect to the vessel.

* * * * *